(12) United States Patent
Chen et al.

(10) Patent No.: US 11,630,219 B2
(45) Date of Patent: Apr. 18, 2023

(54) PRESSURE-REGULATING LARGE-AREA WINDOWLESS AIRFLOW PROPORTIONAL COUNTER

(71) Applicant: Institute of Nuclear Energy Research, Atomic Energy Council, Executive Yuan, R.O.C, Taoyuan (TW)

(72) Inventors: Chin-Chi Chen, Taoyuan (TW); Ming-Chen Yuan, Taoyuan (TW)

(73) Assignee: INSTITUTE OF NUCLEAR ENERGY RESEARCH, ATOMIC ENERGY COUNCIL, EXECUTIVE YUAN, R.O.C, Taoyuan (TW)

( * ) Notice: Subject to any disclaimer, the term of this patent is extended or adjusted under 35 U.S.C. 154(b) by 0 days.

(21) Appl. No.: 17/388,161

(22) Filed: Jul. 29, 2021

(65) Prior Publication Data
US 2023/0036752 A1 Feb. 2, 2023

(51) Int. Cl.
*G01T 1/185* (2006.01)
(52) U.S. Cl.
CPC ................................... *G01T 1/185* (2013.01)
(58) Field of Classification Search
CPC ........................................................ G01T 1/185
See application file for complete search history.

(56) References Cited

U.S. PATENT DOCUMENTS

| | | | | |
|---|---|---|---|---|
| 2003/0030444 A1* | 2/2003 | Kogawa | ................... | G01T 1/178 324/464 |
| 2014/0077092 A1* | 3/2014 | Kopp | ...................... | G01T 3/008 29/428 |

FOREIGN PATENT DOCUMENTS

TW 708927 B1 * 11/2020

OTHER PUBLICATIONS

Ordela (ORDELA Model 8600A-LB Ultra-Lowbackground, Windowless, Gas-Flow, Large-Area Proportional Counter; https://ordelacom.files.wordpress.com/2019/01/8600a-lb.1.pdf, May 2, 2011) (Year: 2011).*

* cited by examiner

*Primary Examiner* — David P Porta
*Assistant Examiner* — Gisselle M Gutierrez
(74) *Attorney, Agent, or Firm* — Locke Lord LLP; Tim Tingkang Xia, Esq.

(57) ABSTRACT

A pressure-regulating large-area windowless airflow proportional counter is provided, which includes a chamber, a metal tray, a side cover, a gas cylinder, and a voltage input and signal output terminal. The chamber has a side opening. A large-area source is placed on the metal tray and the metal tray is moved into or out of the chamber via the side opening. The side cover is fixed to the side opening by an O-ring via a locking device to form an airtight structure. The gas cylinder is used to supply a dedicated gas into the chamber. The voltage-input/signal-output terminal is used to supply voltage to an anode wire net. The free electrons generated by the large-area source due to the free phenomenon are collected by the anode wire net, and outputted to a voltage signal processing module through the voltage-input/signal-output terminal for analysis of pulse height or pulse count.

4 Claims, 3 Drawing Sheets

PRESSURE-REGULATING LARGE-AREA WINDOWLESS AIRFLOW PROPORTIONAL COUNTER

TECHNICAL FIELD

The technical field relates to a windowless airflow proportional counter. The technical field further relates to a pressure-regulating large-area windowless airflow proportional counter.

BACKGROUND

A large-area windowless airflow proportional counter is majorly used to measure or calibrate the emission rate of a standard metal radiation source emitting α particles or β particles from the surface thereof. The areas (length×width) of these types of the metal radiation sources are usually 12 cm×17 cm. The maximal area thereof can be up to about 21 cm×30 cm and the thickness thereof may be about 0.3 cm. These types of the metal radiation sources are applicable to calibrate the detection efficiencies of surface contamination detectors. Regarding α particle radiation sources, a large-area windowless airflow proportional counter should have the ability to measure all α particles whose energies are greater than the noises of a system according to the requirements of ISO8769. Regarding β particle radiation sources, the large-area windowless airflow proportional counter should have the ability to measure the pulse signals of all β particles whose energies are greater than 0.6 keV according to the requirements of ISO8769. As described above, a large-area windowless airflow proportional counter measurement system should be able to detect the events caused by α particles or β particles whose energies greater than a specific value or whose pulse heights are higher than a specific level. Therefore, making sure that the same kind of particles having the same energy can generate pulses having the same height has become the key of determining whether a measurement system can accurately measure the emission rates of α particles or β particles emitted from radiation sources.

According to the principle of a proportional counter measuring radiation, when an energetic particle (the energetic particle is a high-energy particle with energy greater than 10 keV) enters the chamber of the proportional counter, the energetic particle ionizes the gas in the chamber to form an initial pair of ions (a free electron and a positive ion). In general, whenever the energetic particle provides the energy of 30 eV for the gas in the chamber, the gas in the chamber can generate one pair of ions. The electron of the initial ion pair is accelerated by the electric field of the proportional counter. When the kinetic energy of the electron is sufficient, other gas molecules can also be ionized, such that the number of the ion pairs increases and the signals outputted by the proportional counter also increase accordingly, which is so-called "gas amplification effect". For a cylindrical proportional counter, the signal amplification power (M) caused by gas amplification effect are relevant to the voltage applied to the proportional counter, the radius (a) of the anode wire of the proportional counter, the distance between the center of the anode wire and the cathode, the air pressure of the chamber, the type of the gas, etc. According to the research of Diethorn, a cylindrical proportional counter can be expressed as Equation (1) given below. In Equation (1), ΔV stands for the potential difference of two ionization phenomena consecutively triggered by the electron. K stands for the minimum ratio, needed for generating gas amplification effect, of the electric field to the air pressure. For one type of gas, ΔV and K are constants.

$$M = \frac{V}{\ln(b/a)} \cdot \frac{\ln 2}{\Delta V}\left(\ln\frac{V}{pa\ln(b/a)} - \ln K\right) \quad (1)$$

For a large-area airflow proportional counter having a plurality of anode wires, Equation (1) may not preciously estimate the amplification power (M) thereof. However, the mutual relations between these influence factors still have high reference value. In these influence factors, the air pressure of the chamber tends to change due to the influences from the air pressure of the environment. The distance between the center of the anode wire and the cathode (metal chamber) may vary with the thickness of the standard radiation source (in this case, the standard radiation source is considered a part of the chamber). Besides, ΔV and K may change after air infiltrates into the chamber because the airtightness of the chamber is poor. On the other hand, the voltage applied to the proportional counter and the radius of the anode wire are relevant to the hardware design and the manufacturing process, and do not tend to be influenced by the environmental conditions. Thus, if the object is to improve the stability and accuracy of a large-area windowless airflow proportional counter for a long period of time so as to make sure that the measurement system can detect the signals of a certain energy level, it is necessary to reduce or overcome the influences caused by the aforementioned factors, such as the air pressure, the distance between the center of the anode wire to the cathode and the airtightness of the chamber, etc.

Currently, it is usually to use a large-area windowless airflow proportional counter to serve as the detector to measure or calibrate the emission rate of a large-area radiation source emitting α particles or β particles. FIG. 1 and FIG. 2 are views for illustrating the structures of currently available large-area windowless airflow proportional counters. As shown in FIG. 1, a large-area source 12 is fixed on the upper cover plate 16 of the currently available top-open large-area windowless airflow proportional counter 10. The large-area source 12 is disposed at the source entrance 18 and the size of the source entrance 18 is 14 cm×19 cm. There is an O-ring 22 between the upper cover plate 16 and the chamber 20 in order to prevent gas from leaking; the perimeter of the O-ring 22 is about 70 cm. The top-open large-area windowless airflow proportional counter 10 has a gas outlet 14. When the top-open large-area windowless airflow proportional counter 10 is in operation, the dedicate gas supplied by the gas cylinder 30 is inputted into the chamber 20 via the gas inlet 24 of the chamber 20. Meanwhile, the voltage-input/signal-output terminal 26 supplies voltage to the anode wire net 28 and the anode wire net 28 collects the free electrons generated due to ionization phenomenon. Then, the voltage-input/signal-output terminal 26 outputs the electrons to the voltage signal processing module 32 in order to execute the analysis of pulse height or pulse count. However, the top-open large-area windowless airflow proportional counter 10 has at least following five shortcomings: (1) since there is no design or device for fixing the upper cover plate 16 with the chamber 20, air is apt to infiltrate into the chamber 20, which may change the composition of the gas in the chamber 20; (2) it is usually to input the gas into the chamber 20 by high flow rate to prevent air from infiltrating into the chamber 20 with a view to make the chamber 20 be in micro positive pressure; (3) the electric field inside the chamber 20 may vary with the thickness of the radiation source, which results in the error of the energy level setting; (4) since the O-ring 22 is usually made of an insulation material, the potential of the upper cover plate 16 may be different from that of the chamber 20, such that the electric field may be unstable; it is necessary to connect the chamber 20 to the upper cover plate 16 so as to improve this situation; (5) the risk that the large-area source 12 falls from the upper cover plate 16 to damage the anode wire net 28 may exist.

As shown in FIG. 2, a large-area source 42 is placed on the chamber bottom plate 44 of the currently available bottom-open large-area windowless airflow proportional counter 40 and the size of the chamber bottom plate 44 is about 25 cm×35 cm. The chamber bottom plate 44 is fixed on a lifting device 46. The control rod 48 of the lifting device 46 can be rotated to lift up the chamber bottom plate 44 so as to tightly press the chamber bottom plate 44 against the chamber 50. There is an O-ring 52 between the chamber bottom plate 44 and the chamber 50 so as to prevent the gas from leaking and the perimeter of the O-ring 52 is about 112 cm. The bottom-open large-area windowless airflow proportional counter 40 has a gas outlet 54. When the bottom-open large-area windowless airflow proportional counter 40 is in operation, the dedicate gas supplied by the gas cylinder 60 is inputted into the chamber 50 via the gas inlet 56 of the chamber 50. Meanwhile, the voltage-input/signal-output terminal 56 supplies voltage to the anode wire net 62 and the anode wire net 60 collects the free electrons generated due to ionization phenomenon. Then, the voltage-input/signal-output terminal 58 outputs the electrons to the voltage signal processing module 64 in order to execute the analysis of pulse height or pulse count. The shortcomings of the bottom-open large-area windowless airflow proportional counter 40 are the same with those of the top-open large-area windowless airflow proportional counter 10. In addition, the O-ring 52 of the bottom-open large-area windowless airflow proportional counter 40 is designed to be longer in length, which increases the probability of gas leaking out of the chamber or air infiltrating into the chamber 50. Moreover, since the force, applied by the lifting device 46, for pressing the chamber bottom plate 44 against the chamber 50 is non-uniform, it is very difficult to prevent gas from leaking out of the chamber 50 or prevent air from infiltrating into the chamber 50. Similarly, the bottom-open large-area windowless airflow proportional counter 40 cannot improve the problem that the electric field varies with the thickness of the radiation source.

Therefore, it is necessary to provide a large-area windowless airflow proportional counter capable of adjusting the air pressure thereof, keeping the gas inside the counter flowing and maintain the purity of the gas with a view to solve the above problems.

SUMMARY

One of the primary objects of the disclosure is to provide a pressure-regulating large-area windowless airflow proportional counter capable of adjusting the air pressure thereof, keeping the gas inside the counter flowing and maintain the purity of the gas.

An embodiment of the disclosure relates to a pressure-regulating large-area windowless airflow proportional counter, which includes a chamber, a metal tray, a side cover, a gas cylinder and a voltage-input/signal-output terminal. The chamber has a side opening. A large-area source is placed on the metal tray, and the metal tray can be moved into or out of the chamber via the side opening. The side cover is fixed to the side opening by an O-ring via a locking device to form an airtight structure. The gas cylinder supplies a dedicated gas into the chamber via the gas inlet of the chamber. The voltage-input/signal-output terminal supplies voltage to an anode wire net. The free electrons generated by the large-area source due to ionization phenomenon are collected by the anode wire net, and outputted to a voltage signal processing module through the voltage-input/signal-output terminal so as to perform the analysis of pulse height or pulse count.

Compared with currently available large-area windowless airflow proportional counter, the pressure-regulating large-area windowless airflow proportional counter according to the embodiments of the disclosure may have the following advantages:

(1) According to one embodiment of the disclosure, the source entrance is disposed at one side of the counter in order to decrease the perimeter of the O-ring, and the metal side cover, O-ring and metal chamber are stably combined with each other via metal screws. Thus, the airtightness of the chamber can be significantly increased.

(2) According to one embodiment of the disclosure, the counter includes a liquid-based air pressure control device and the air pressure of the chamber can be stably controlled to be a setting value by adjusting the immersed depth of a gas pipe immersed in the air pressure control device. Accordingly, gas can be smoothly and continuously inputted into or outputted from the chamber.

(3) According to one embodiment of the disclosure, the counter includes a protection wire net disposed between the radiation source and the protection wire net. Thus, the electric field is mainly generated between the anode wire net and the protection wire net in order to avoid that the strength of the electric field varies with the thickness of the radiation source. In this way, the gas amplification effect can be stabilized.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The disclosure will become more fully understood from the detailed description given herein below and the accompanying drawings which are given by way of illustration only, and thus are not limitative of the disclosure and wherein.

DETAILED DESCRIPTION

Figure 1:
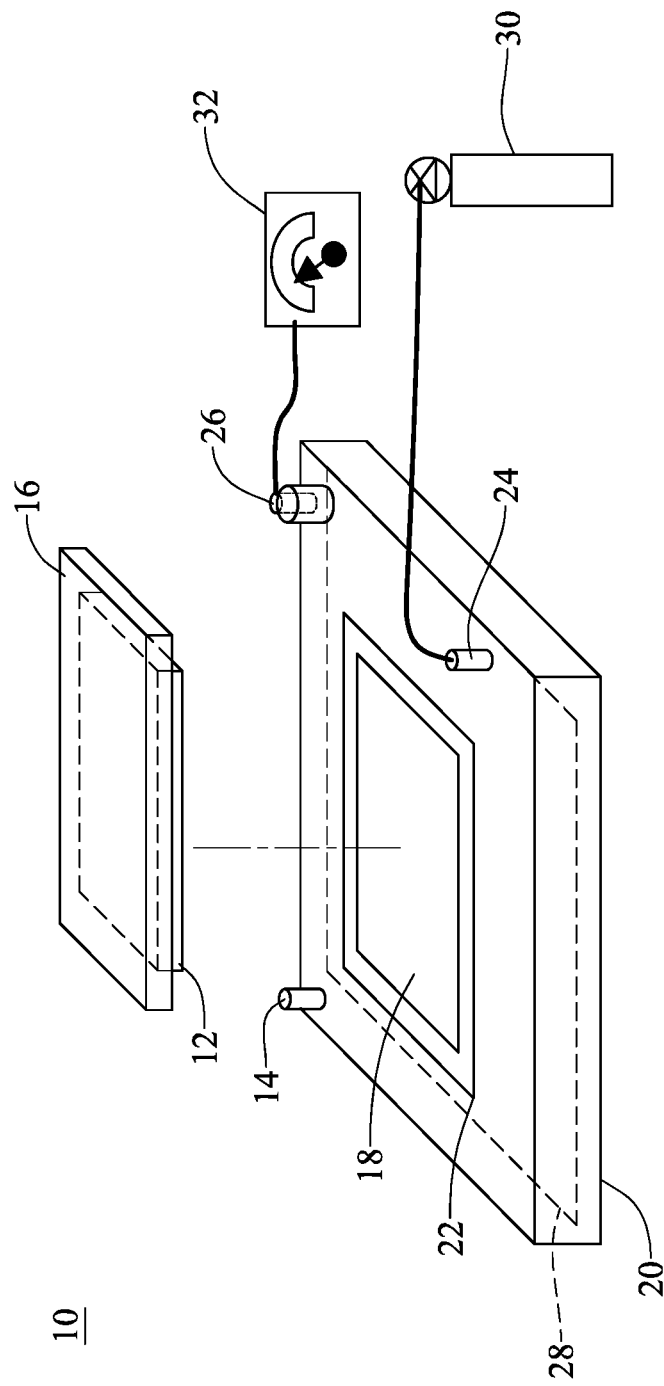
FIG. 1 is a view for illustrating the structure of a currently available top-open large-area windowless airflow proportional counter.
Figure 2:
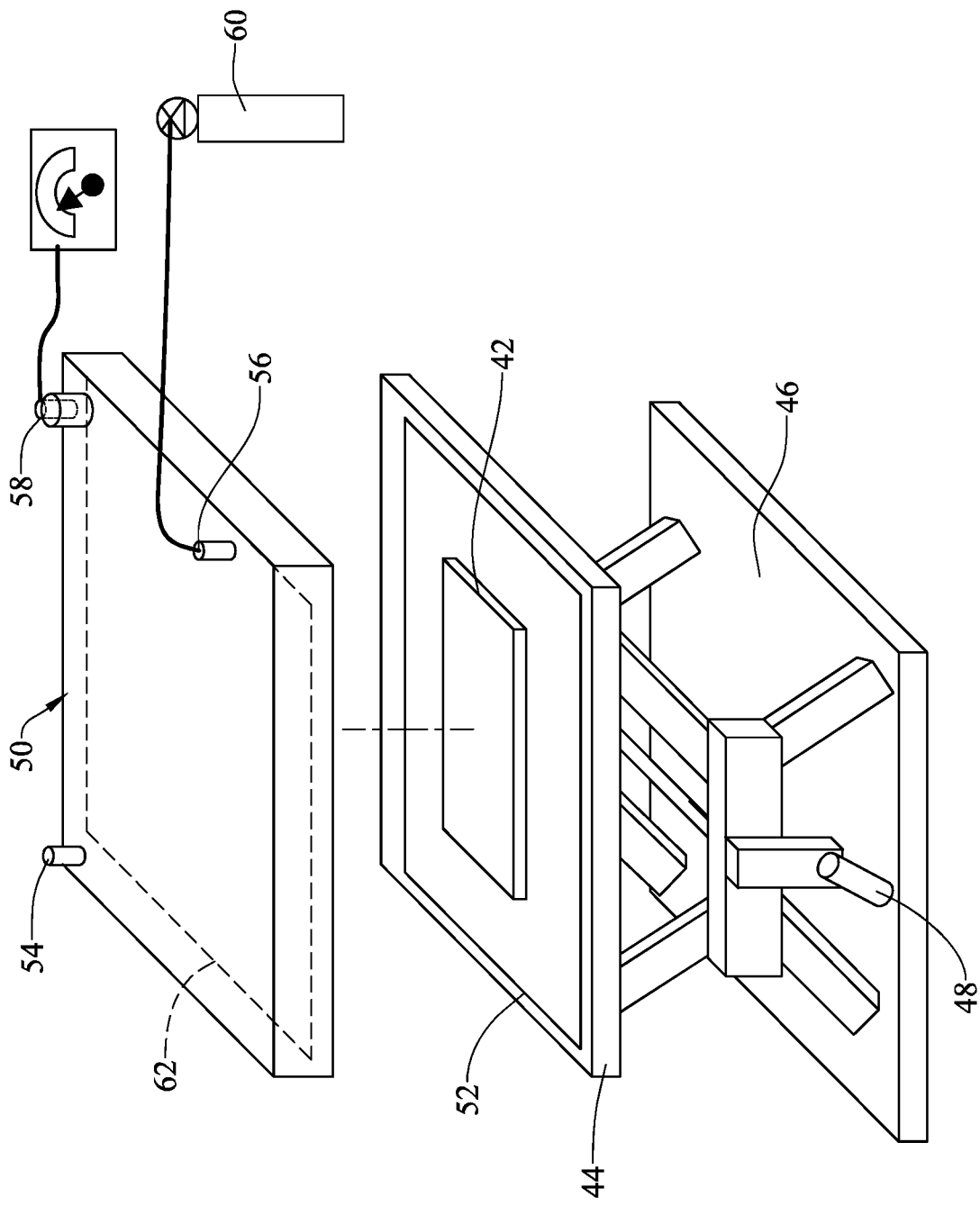
FIG. 2 is a view for illustrating the structure of a currently available bottom-open large-area windowless airflow proportional counter.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The pressure-regulating large-area windowless airflow proportional counter according to one embodiment of the disclosure is a metal-made large-area windowless airflow proportional counter having a side opening. This counter is applicable to measuring the emission rate of a large-area metal radiation source emitting α particles or β particles. In one embodiment of the disclosure, the counter adopts a side-open structure and an air pressure control device, such that the air pressure of the chamber of the large-area windowless airflow proportional counter is not affected by the air pressure of the environment and the measurement system can be stale for a long term. In addition, as the airtightness of the proportional counter is improved, the gas consumption of the proportional counter can be also greatly reduced.

Figure 3:
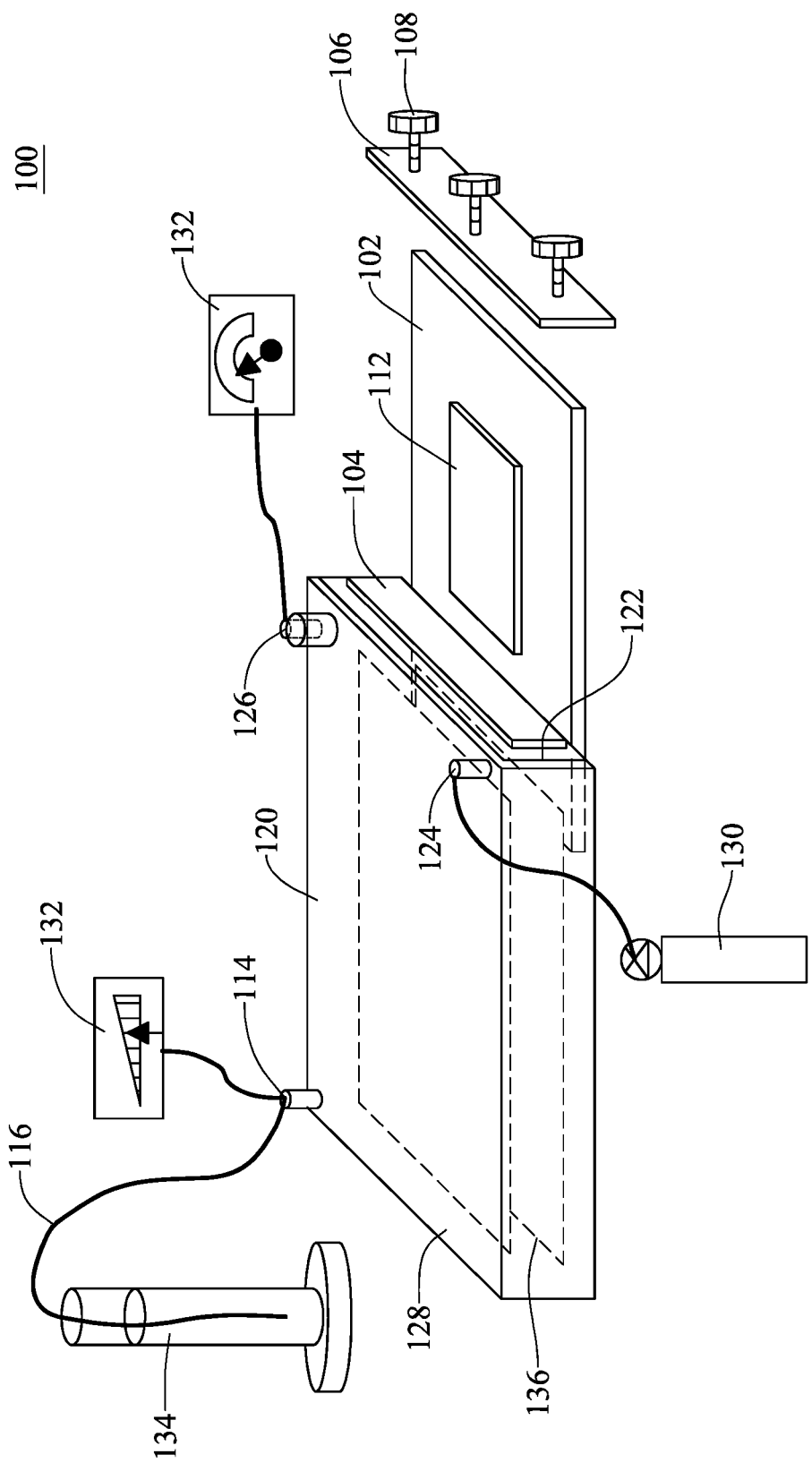
FIG. 3 is a view for illustrating the structure of a pressure-regulating large-area windowless airflow proportional counter in accordance with one embodiment of the disclosure.

Please refer to FIG. 3, which is a view for illustrating the structure of a pressure-regulating large-area windowless airflow proportional counter in accordance with one embodiment of the disclosure. As shown in FIG. 3, the pressure-regulating large-area windowless airflow proportional counter 100 has a chamber 120 and a metal tray 102. The chamber 120 is made of metal and has a side opening 104. A large-area source 112 is disposed on the metal tray 102 and the metal tray 120 can be moved into or out of the chamber 120. In this embodiment of the disclosure, the size of the side opening 104 of the side-open structure is only 23 cm×2 cm. There is an O-ring 122 disposed at the side opening 104 and the perimeter of the O-ring 122 is about 55 cm. The perimeter of the O-ring 122 is obviously less than that of the currently available top-open chamber structure or bottom-open chamber structure, which can effectively prevent gas from leaking. The pressure-regulating large-area windowless airflow proportional counter 100 has a side cover 106 and the side cover 106 is fixed on the chamber 120 by a locking device 108, which can provide uniform and sufficient pressure to tightly press the side cover 106 against the O-ring 122 and the chamber 120 so as to form an airtight structure. The locking device 108 may include a plurality of screws.

The pressure-regulating large-area windowless airflow proportional counter 100 has a gas cylinder 130 for supplying a dedicated gas and the dedicated gas is inputted into the chamber via the gas inlet 124 on the chamber 120. Then, the voltage-input/signal-output terminal 126 applies voltage to the anode wire net 128 and the anode wire net 128 collects the free electrons generated due to ionization phenomenon. Afterward, the voltage-input/signal-output terminal 126 outputs the electrons to the voltage signal processing module 132 in order to execute the analysis of pulse height or pulse count. The dedicated gas may be a mixed gas; for example, 10% of the mixed gas may be $CH_4$ and 90% of the mixed gas may be Ar. The dedicated gas may be other currently available gas applicable to proportional counters.

The pressure-regulating large-area windowless airflow proportional counter 100 further includes a gas outlet 114, a plastic tube 116, an air pressure gauge 132 and an air pressure control device 134. The air pressure control device 134 may be a tube and liquid can be injected in the tube. Thus, the air pressure of the chamber 120 can be adjusted to a setting value by adjusting the immersed depth of a gas pipe immersed in the air pressure control device 134. The setting value is slightly greater than the air pressure of the environment. In general, the setting value is substantially between 1300 hPa and 1500 hPa. The inner pressure of the chamber 120 can be changed by adjusted the relative position between the plastic tube 116 and the level height of the air pressure control device 134.

The side cover 106 of the pressure-regulating large-area windowless airflow proportional counter 100 is fixed by the locking device 108, such that the side cover 106 and the chamber 120 are in equipotential state. Moreover, a protection wire net 136 is disposed between the anode wire net 128 and the large-area source 112, so the electric field is mainly generated between the anode wire net 128 and the inner wall of the chamber 120, and between the anode wire net 128 and the protection wire net 136. Accordingly, the strength of the electric field does not tend to be influenced by the change of the thickness of the radiation source, so the stability of the electric field can be significantly improved.

According to the embodiment of the disclosure, via improving the airtightness of the chamber and the stabilities of the air pressure and the electric field, the measurement result of the large-area windowless airflow proportional counter can be stable for a long term and the accuracy thereof can also be enhanced. Therefore, the proportional counter according to the embodiment of the disclosure can conform to the requirements of ISO8769.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A pressure-regulating large-area windowless airflow proportional counter, comprising:
    a chamber, having a side opening;
    a metal tray, configured to be moved into or out of the chamber via the side opening, wherein a large-area source is placed on the metal tray;
    a side cover, fixed to the side opening by an O-ring via a locking device to form an airtight structure;
    a gas cylinder, configured to supply a dedicated gas into the chamber via a gas inlet of the chamber;
    a voltage-input/signal-output terminal, configured to supply a voltage to an anode wire net, wherein free electrons generated by the large-area source due to an ionization phenomenon are collected by the anode wire net, and outputted to a voltage signal processing module through the voltage-input/signal-output terminal so as to analyze a pulse height or a pulse count; and
    a protection wire net, disposed between the anode wire net and the large-area source, wherein an electric field is mainly generated between the anode wire net and the protection wire net in order to avoid that a strength of the electric field is influenced due to a thickness of the large-area source.

2. The pressure-regulating large-area windowless airflow proportional counter of claim 1, further comprising an air pressure control device, wherein the air pressure control device is a tube configured for a liquid to be injected therein, and an air pressure of the chamber is adjusted to a setting value by adjusting an immersed depth of a gas pipe immersed in the air pressure control device, wherein the setting value is between 1300 hPa and 1500 hPa.

3. The pressure-regulating large-area windowless airflow proportional counter of claim 1, further comprising an air pressure gauge configured to measure an air pressure of the chamber.

4. The pressure-regulating large-area windowless airflow proportional counter of claim 1, wherein the locking device comprises a plurality of screws.

* * * * *